(12) United States Patent
Huang et al.

(10) Patent No.: US 9,236,793 B2
(45) Date of Patent: Jan. 12, 2016

(54) METHODS AND POWER CONTROLLERS FOR PRIMARY SIDE CONTROL

(71) Applicant: Leadtrend Technology Corp., Hsin-Chu (TW)

(72) Inventors: Yu-Yun Huang, Hsin-Chu (TW); Yi-Lun Shen, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 165 days.

(21) Appl. No.: 13/650,098

(22) Filed: Oct. 11, 2012

(65) Prior Publication Data

US 2013/0094254 A1    Apr. 18, 2013

(30) Foreign Application Priority Data

Oct. 12, 2011    (TW) .............................. 100136874 A

(51) Int. Cl.
*H02M 1/42*    (2007.01)
*H02M 3/335*    (2006.01)

(52) U.S. Cl.
CPC ........ *H02M 1/4258* (2013.01); *H02M 3/33523* (2013.01); *Y02B 70/126* (2013.01)

(58) Field of Classification Search
CPC ....... H02M 1/4258; H02M 1/32; H02M 3/24; H02M 2001/0025; H02M 2001/0032
USPC ........................................... 363/21.02–21.18
See application file for complete search history.

(56) References Cited

U.S. PATENT DOCUMENTS

| | | | | |
|---|---|---|---|---|
| 5,173,847 A * | 12/1992 | Suzuki | ...................... | 363/21.14 |
| 5,498,995 A * | 3/1996 | Szepesi et al. | ................ | 327/538 |
| 5,583,422 A * | 12/1996 | Schirmer et al. | .............. | 323/224 |
| 5,903,452 A * | 5/1999 | Yang | ............................... | 363/97 |
| 6,611,439 B1 * | 8/2003 | Yang et al. | ...................... | 363/41 |
| 6,836,415 B1 * | 12/2004 | Yang et al. | ................. | 363/21.01 |
| 6,977,824 B1 * | 12/2005 | Yang et al. | ................. | 363/21.16 |
| 7,016,204 B2 * | 3/2006 | Yang et al. | ................. | 363/21.13 |
| 7,054,170 B2 * | 5/2006 | Yang et al. | ................. | 363/21.18 |
| 7,061,780 B2 * | 6/2006 | Yang et al. | ................. | 363/21.16 |
| 7,088,598 B2 * | 8/2006 | Yang et al. | ................. | 363/21.01 |
| 7,443,700 B2 * | 10/2008 | Yan et al. | ................... | 363/21.01 |
| 7,505,287 B1 * | 3/2009 | Kesterson | ................. | 363/21.01 |
| 7,522,431 B2 * | 4/2009 | Huynh et al. | .............. | 363/21.12 |
| 7,616,461 B2 * | 11/2009 | Yang et al. | .................. | 363/56.1 |
| 7,643,313 B2 * | 1/2010 | Lin | ................. | 363/20 |
| 7,656,685 B2 * | 2/2010 | Yang et al. | ................. | 363/21.01 |
| 7,679,938 B2 * | 3/2010 | Ye et al. | ..................... | 363/21.12 |
| 7,906,943 B2 * | 3/2011 | Isobe et al. | ..................... | 323/223 |
| 7,969,753 B2 * | 6/2011 | Huynh et al. | .............. | 363/21.01 |

(Continued)

*Primary Examiner* — Timothy J Dole
*Assistant Examiner* — Yusef Ahmed
(74) *Attorney, Agent, or Firm* — Winston Hsu; Scott Margo

(57) ABSTRACT

Power controllers and related primary-side control methods are disclosed. A disclosed power controller has a comparator and an ON-triggering controller. The comparator compares a feedback voltage with an over-shot reference voltage. Based on an inductance-coupling effect, the feedback voltage represents a secondary-side voltage of a secondary winding. Coupled to the comparator, the ON-triggering controller operates a power switch at about a first switching frequency when the feedback voltage is lower than the over-shot reference voltage. The ON-triggering controller operates the power switch at about a second switching frequency when the feedback voltage exceeds the over-shot reference voltage. The second switching frequency is less than the first switching frequency.

7 Claims, 3 Drawing Sheets

(56) References Cited

U.S. PATENT DOCUMENTS

| | | | |
|---|---|---|---|
| 8,018,741 B2* | 9/2011 | Huynh et al. | 363/21.01 |
| 8,390,964 B2* | 3/2013 | Chang et al. | 361/18 |
| 8,391,028 B2* | 3/2013 | Yeh | 363/21.05 |
| 8,629,630 B2* | 1/2014 | Shiu et al. | 315/307 |
| 8,717,785 B2* | 5/2014 | Gaknoki et al. | 363/21.13 |
| 2003/0098861 A1* | 5/2003 | Nakatsuka et al. | 345/212 |
| 2005/0024898 A1* | 2/2005 | Yang et al. | 363/21.12 |
| 2005/0213353 A1* | 9/2005 | Lys | 363/17 |
| 2005/0219872 A1* | 10/2005 | Lys | 363/21.04 |
| 2006/0055433 A1* | 3/2006 | Yang et al. | 327/10 |
| 2006/0056204 A1* | 3/2006 | Yang et al. | 363/10 |
| 2006/0077697 A1* | 4/2006 | Yang | 363/21.13 |
| 2008/0025054 A1* | 1/2008 | Yang et al. | 363/56.01 |
| 2008/0062725 A1* | 3/2008 | Yang | 363/21.1 |
| 2008/0123372 A1* | 5/2008 | Yang | 363/21.16 |
| 2008/0231247 A1* | 9/2008 | Uehara | 323/284 |
| 2008/0259650 A1* | 10/2008 | Huynh et al. | 363/21.12 |
| 2009/0147546 A1* | 6/2009 | Grande et al. | 363/21.16 |
| 2009/0147547 A1* | 6/2009 | Yamashita | 363/21.16 |
| 2009/0206814 A1* | 8/2009 | Zhang et al. | 323/284 |
| 2009/0296427 A1* | 12/2009 | Djenguerian et al. | 363/21.12 |
| 2010/0033146 A1* | 2/2010 | Irissou et al. | 323/282 |
| 2010/0128501 A1* | 5/2010 | Huang et al. | 363/21.16 |
| 2010/0321956 A1* | 12/2010 | Yeh | 363/16 |
| 2010/0321962 A1* | 12/2010 | Lee et al. | 363/21.12 |
| 2011/0116287 A1* | 5/2011 | Huang et al. | 363/21.13 |
| 2012/0075891 A1* | 3/2012 | Zhang et al. | 363/21.18 |
| 2013/0033902 A1* | 2/2013 | Zhang | 363/15 |
| 2013/0033905 A1* | 2/2013 | Lin et al. | 363/21.13 |
| 2013/0058138 A1* | 3/2013 | Djenguerian et al. | 363/21.13 |

* cited by examiner

METHODS AND POWER CONTROLLERS FOR PRIMARY SIDE CONTROL

BACKGROUND OF THE INVENTION

1. Field of the Invention

The present invention relates to a primary side control (PSC) switching-mode power supply (SMPS), and particularly to a PSC SMPS that has reduced output voltage jitter.

2. Description of the Prior Art

Power supplies are a necessary electronic device in most electronic products, and are used for converting battery or grid power to power required by the electronic product and having specific characteristics. In most power supplies, switching-mode power supplies have superior electrical energy conversion efficiency and smaller product dimensions, making them popular in the power supply market.

Two different control schemes are used in current switching-mode power supplies: primary side control (PSC) and secondary side control (SSC). SSC directly couples a detection circuit to an output node of a secondary winding of a power supply, then through a photo coupler, transmits a detection result to a power supply controller located on the primary side to control energy of the power supply that is to be stored and converted on the primary winding. Compared to SSC, PSC indirectly detects voltage outputted by the secondary winding through directly detecting reflected voltage on an auxiliary winding, and indirectly completes detection of output voltage on an output node of the power supply. PSC completes detection and energy conversion control on the primary side. Compared to SSC, PSC is able to lower cost, as PSC does not require the photo coupler having both greater size and cost. PSC may also have higher conversion efficiency, because PSC does not require the detection circuit on the secondary side that constantly drains energy.

FIG. 1 is a diagram of a switching-mode power supply that uses PSC. Bridge rectifier 20 rectifies alternating current from grid node AC to establish direct current input power at input node IN. Voltage $V_{IN}$ of output power may have an M-shaped waveform, but may also be filtered into a fixed level that roughly does not vary over time. Transformer has three windings: primary winding PRM, secondary winding SEC, and auxiliary winding AUX. Power supply controller 26 periodically controls power switch 34 through gate node GATE. When power switch 34 is ON, primary winding PRM performs energy storage. When power switch 34 is OFF, secondary winding SEC and auxiliary winding AUX discharge to establish output voltage VOUT on output node OUT for supply to load 24, and control voltage VCC for supply to power supply controller 26.

Voltage divider resistors 28, 30 detect voltage $V_{AUX}$ of auxiliary winding AUX to provide feedback voltage $V_{FB}$ to feedback node FB of power supply controller 26. According to feedback voltage $V_{FB}$, power supply controller 26 establishes compensation voltage $V_{COM}$ on compensation capacitor 32, and controls power switch 34 according thereto.

FIG. 2 shows the power supply controller 26 of FIG. 1 and some external components. Power supply controller 26 comprises sampler 12, pulse generator 14, transconductor 15, and pulse width controller 16. During discharging of secondary winding SEC and auxiliary winding AUX, pulse generator 14 provides a short pulse to sampler 12, so that sampler 12 samples feedback voltage $V_{FB}$ to generate feedback voltage $V_{IFB}$ at intermediate node IFB. Through feedback node FB, voltage divider resistors 28 and 30, and auxiliary winding AUX, feedback voltage $V_{IFB}$ equivalently represents voltage level of secondary winding voltage $V_{SEC}$ of secondary winding SEC during discharging, and roughly represents output voltage $V_{OUT}$. Transconductor 15 controls compensation voltage $V_{COM}$ on compensation node COMP according to a comparison result of feedback voltage $V_{IFB}$ and target voltage $V_{REF}$. Pulse width controller 16 controls power switch 34 according to compensation voltage $V_{COM}$. Overall, power supply controller 26 provides a feedback mechanism that roughly stabilizes feedback voltage $V_{IFB}$ to target voltage $V_{REF}$, and is thus able to stabilize output voltage $V_{OUT}$.

SUMMARY OF THE INVENTION

According to an embodiment, a primary-side control method comprises providing a feedback voltage, the feedback voltage representing a secondary-side voltage of a secondary winding through an inductance-coupling effect; controlling a power switch by a first switching frequency; comparing the feedback voltage and an over-shot reference voltage; and controlling the power switch by a second switching frequency when the feedback voltage is greater than the over-shot reference voltage. The second switching frequency is lower than the first switching frequency.

According to an embodiment, a power supply controller for performing primary-side control comprises a comparator and an ON triggering controller. The comparator is for comparing a feedback voltage and an over-shot reference voltage. The feedback voltage represents a secondary-side voltage of a secondary winding through an inductance-coupling effect. The ON-triggering controller is coupled to the comparator. When the feedback voltage is lower than the over-shot reference voltage, the ON-triggering controller causes a power switch to operate at approximately a first switching frequency. When the feedback voltage is higher than the over-shot reference voltage, the ON-triggering controller causes the power switch to operate at approximately a second switching frequency. The second switching frequency is lower than the first switching frequency.

According to an embodiment, a power management system comprises a transformer, a power switch, and a power supply controller. The transformer has a primary winding, an auxiliary winding, and a secondary winding. The power switch is coupled to the primary winding for controlling an inductance current flowing through the primary winding. The power supply controller is for controlling the power switch, and comprises a feedback node, a comparator, and an ON-triggering controller. The feedback node is coupled to the auxiliary winding. The comparator is for comparing a feedback voltage and an over-shot reference voltage. The feedback voltage represents a secondary-side voltage of the secondary winding through the feedback node and the auxiliary winding. The ON-triggering controller is coupled to the comparator. The ON-triggering controller causes the power switch to operate approximately at a first switching frequency when the feedback voltage is lower than the over-shot reference voltage, and the ON-triggering controller causes the power switch to operate approximately at a second switching frequency when the feedback voltage is higher than the over-shot reference voltage. The second switching frequency is lower than the first switching frequency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
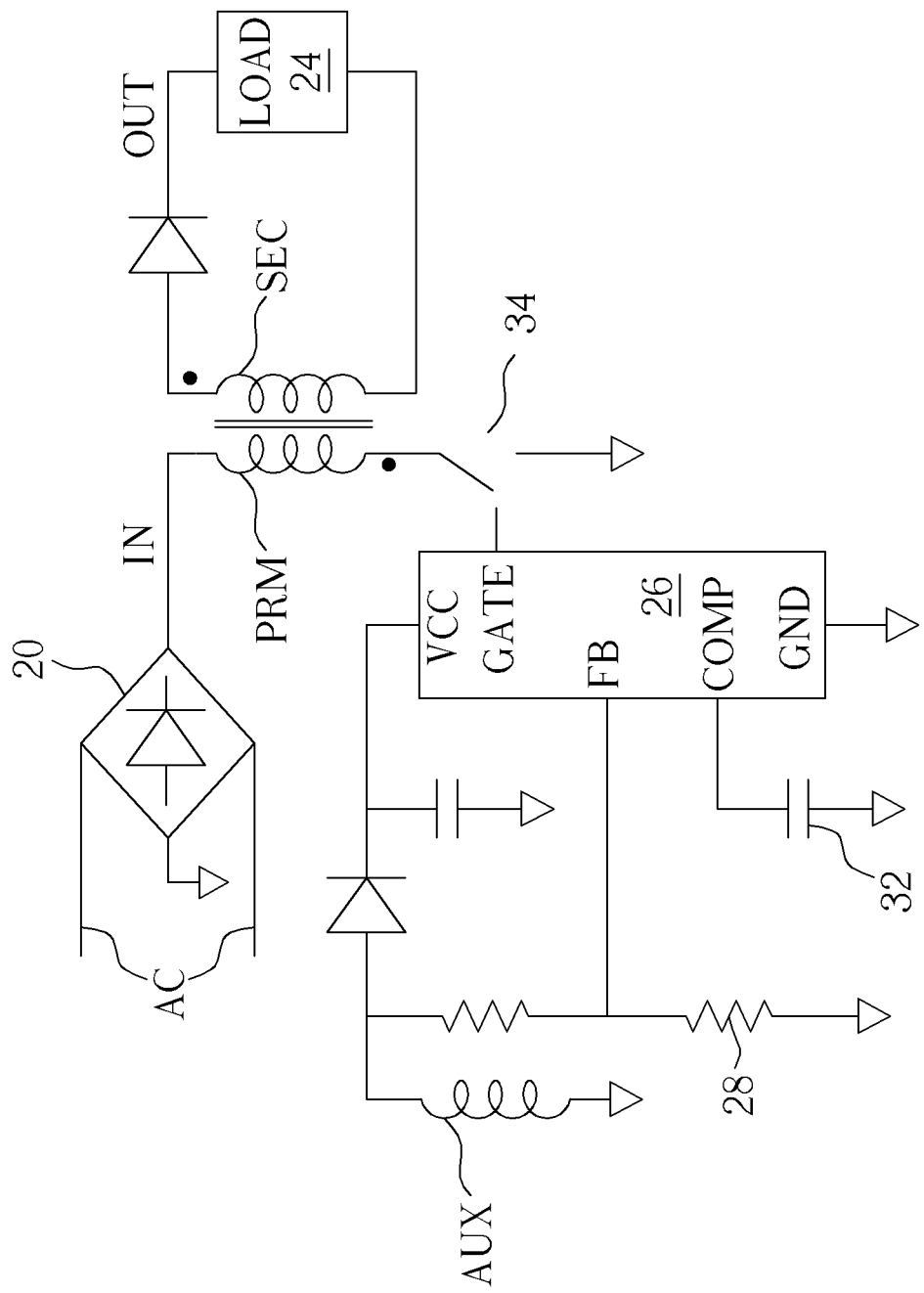
FIG. 1 is a diagram of a switching-mode power supply that uses PSC.

In the following examples, components sharing the same reference numerals have similar or the same function, structure, and operation. Persons of ordinary skill in the art may arrive at simple alterations or modifications of the embodiments of the detailed description according to the teachings and disclosure herein without leaving the spirit of the present invention.

Figure 2:
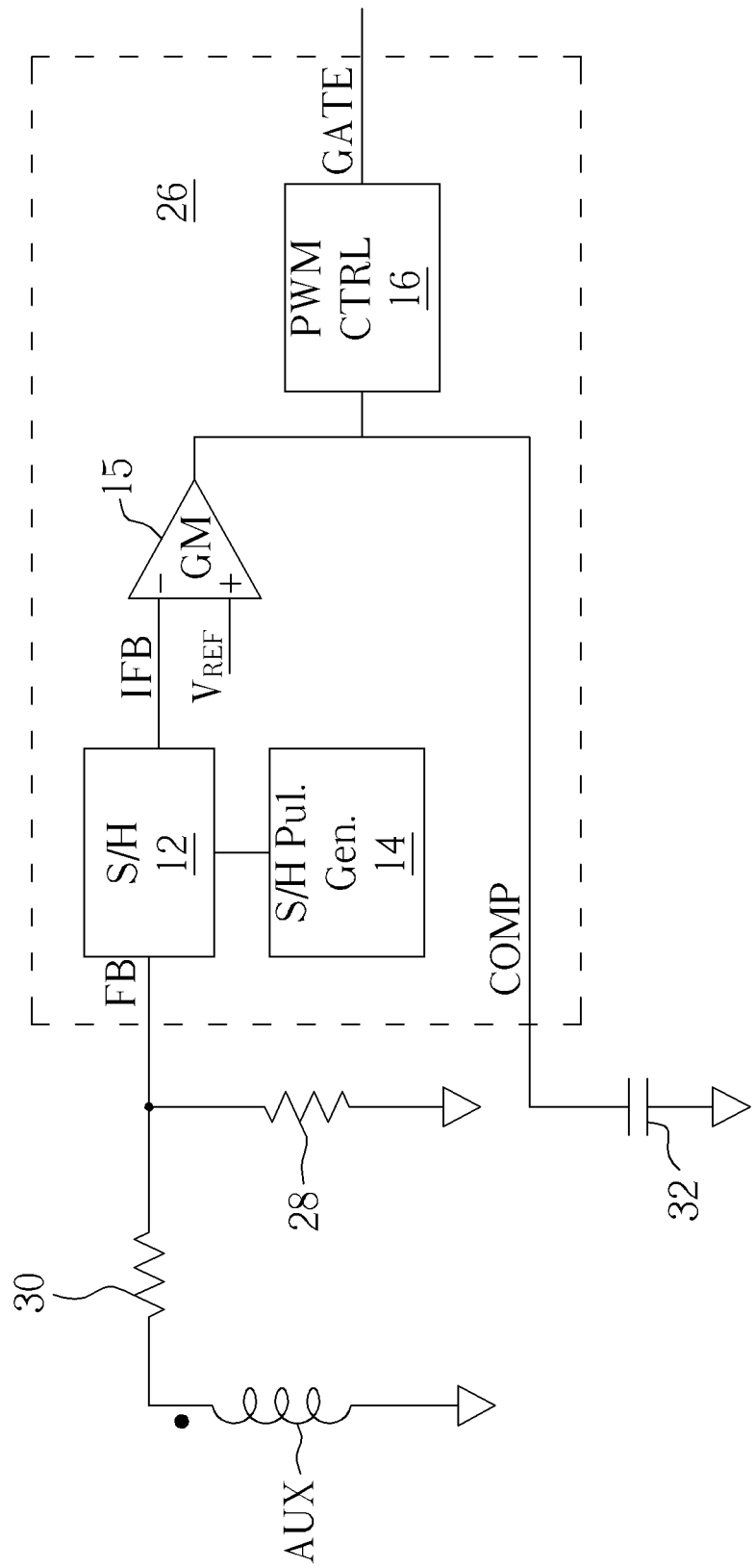
FIG. 2 shows the power supply controller of FIG. 1 and some external components.

The power supply controller 26 of FIG. 2 may exhibit excessive output voltage VOUT jitter during light-heavy load switching.

For example, when load 24 suddenly transitions from a heavy load to a light load or no load, output voltage $V_{OUT}$ will suddenly rise. And, power supply controller 26 must wait for a period of time, in which transconductor 15 pulls compensation voltage $V_{COM}$ down to a certain level, such that energy converted by transformer is lower than energy consumed by load 24, before output voltage $V_{OUT}$ can begin to fall. However, at this time, output voltage $V_{OUT}$ is very likely to already have exceeded the required specification of the power supply management system.

Figure 3:
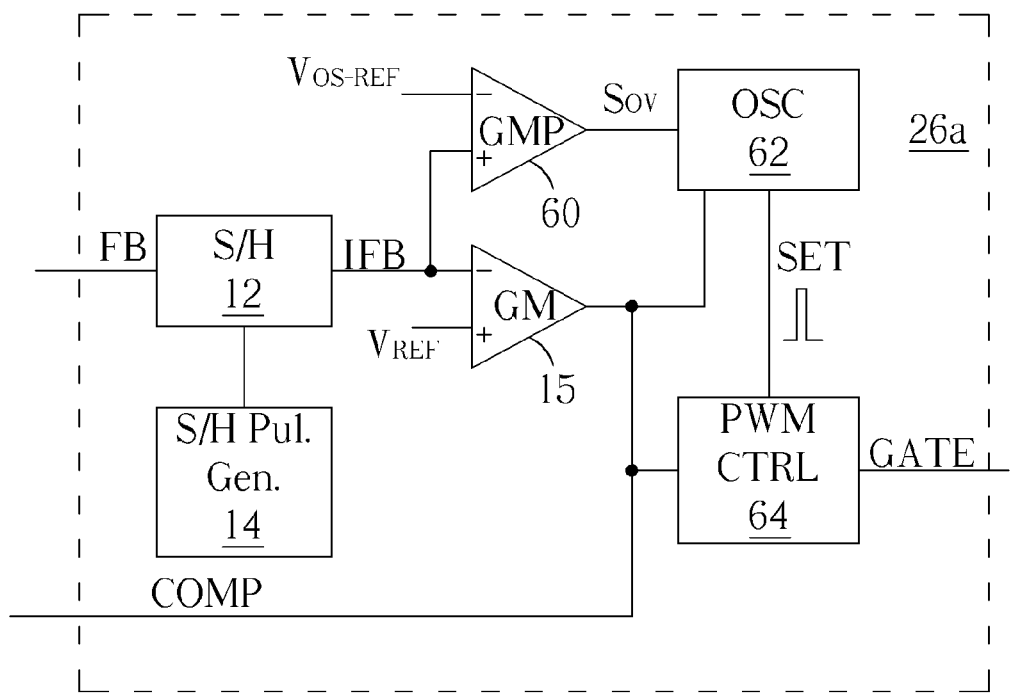
FIG. 3 is a diagram of a power supply controller according to an embodiment.

FIG. 3 is a diagram of a power supply controller $26_a$ according to an embodiment. Power supply controller $26_a$ replaces power supply controller 26 of FIG. 1.

Power supply controller $26_a$ comprises sampler 12, pulse generator 14, transconductor 15, comparator 60, oscillator 62, and pulse width controller 64.

After pulse width controller 64 turns power switch 34 off, secondary winding SEC and auxiliary winding AUX begin to release energy stored previously by primary winding PRM while power switch 34 was turned on. The time for secondary winding SEC and auxiliary winding AUX to release electrical energy is called discharge time $T_{DIS}$. During discharge time $T_{DIS}$, pulse generator 14 provides a short pulse to cause sampler 12 to sample feedback voltage $V_{FB}$ on feedback node FB. A sample result is then stored on intermediate node IFB as feedback voltage $V_{IFB}$. Thus, feedback voltage $V_{IFB}$ approximately represents output voltage $V_{OUT}$ through voltage division and inductive coupling through feedback node FB, voltage divider resistors 28 and 30, auxiliary winding AUX, and secondary winding SEC.

Transconductor 15 controls compensation voltage $V_{COM}$ according to feedback voltage $V_{IFB}$ and target voltage $V_{REF}$. In some embodiments, pulse width controller 64 determines ON time $T_{ON}$ of power switch 34 per one switching period according to compensation voltage $V_{COM}$ on compensation node COMP, which is time in which power switch 34 is short circuited.

Oscillator 62 provides set signal $S_{SET}$ through set node SET, which periodically triggers turning on of power switch 34. Thus, switching frequency of power switch 34 is approximately equal to frequency of set signal $S_{SET}$. In some embodiments, frequency of set signal $S_{SET}$ can be determined from compensation voltage $V_{COM}$. For example, frequency of set signal $S_{SET}$ can decrease with decreasing compensation voltage $V_{COM}$.

Comparator 60 compares feedback voltage $V_{IFB}$ and over-shot reference voltage $V_{OS-REF}$. Comparison result $S_{OV}$ of comparator 60 affects frequency of set signal $S_{SET}$ provided by oscillator 62. For example, when feedback voltage $V_{IFB}$ is lower than over-shot reference voltage $V_{OS-REF}$, comparison result $S_{OV}$ is logic 0, and frequency of set signal $S_{SET}$ may be determined solely by compensation voltage $V_{COM}$ to be, for example, 60 KHz. As soon as feedback voltage $V_{IFB}$ exceeds over-shot reference voltage $V_{OS-REF}$, comparison result $S_{OV}$ becomes logic 1, and frequency of set signal $S_{SET}$ immediately drops to be fixed at, for example, 25 KHz.

Power supply controller $26_a$ of FIG. 3 can suppress output voltage $V_{OUT}$ jitter when transitioning from a heavy load to a light load. The following description is made with reference to FIG. 1, with power supply controller $26_a$ replacing power supply controller 26 thereof, and target voltage $V_{REF}$ and over-shot reference voltage $V_{OS-REF}$ assumed to be 2.5V and 2.6V, respectively. As soon as load 24 suddenly transitions from heavy loading to light loading or no loading, because energy output of the transformer exceeds energy consumption of load 24, output voltage $V_{OUT}$ suddenly rises, causing feedback voltage $V_{IFB}$ to start rising in turn. As soon as feedback voltage $V_{IFB}$ exceeds over-shot reference voltage $V_{OS-REF}$ of 2.6V, frequency of set signal $S_{SET}$ immediately drops to a low value, so that electrical power outputted by transformer immediately drops. Compared to the prior art, which must wait for compensation voltage $V_{COM}$ to be pulled down to a certain level before transmitted energy can drop noticeably, as soon as power supply controller $26_a$ discovers that feedback voltage $V_{IFB}$ has exceeded over-shot reference voltage $V_{OS-REF}$ of 2.6V, frequency of set signal $S_{SET}$ is dropped immediately, which also lowers electrical power output of the transformer, thus rapidly prohibiting output voltage $V_{OUT}$ from increasing.

Feedback voltage $V_{IFB}$ is periodically updated as set signal $S_{SET}$ periodically turns on power switch 34, so as to track current output voltage $V_{OUT}$. As long as feedback voltage $V_{IFB}$ is lower than over-shot reference voltage $V_{OS-REF}$ of 2.6V, power supply controller 26a will return to normal operation, e.g. frequency of set signal $S_{SET}$ being determined only on by compensation voltage $V_{COM}$. So, for normal operation, power supply controller $26_a$ and power supply controller 26 are the same, each causing feedback voltage $V_{IFB}$ to converge to target voltage $V_{REF}$ of 2.5V.

Figure 4:
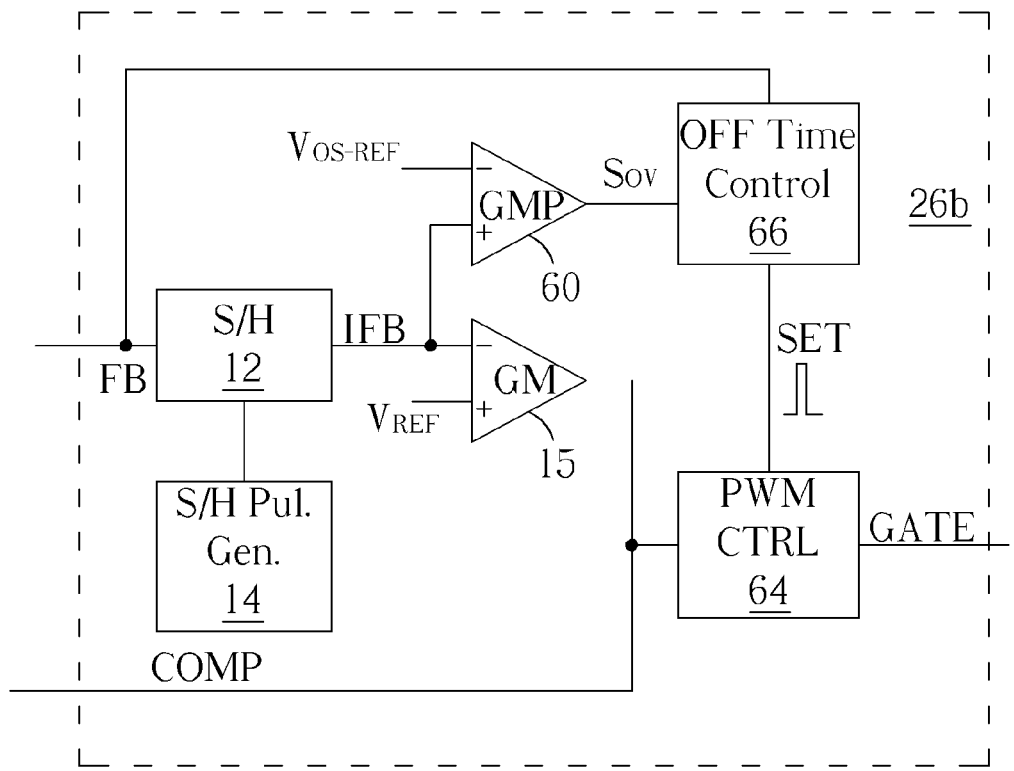
FIG. 4 is a diagram of a power supply controller according to an embodiment.

FIG. 4 is a diagram of a power supply controller $26_b$ according to an embodiment. In the following description, power supply controller $26_b$ replaces power supply controller 26 of FIG. 1 as another embodiment.

Compared to the power supply controller $26_a$ of FIG. 2, power supply controller $26_b$ has OFF time controller 66 coupled to feedback node FB. OFF time controller 66 may employ valley switching. For example, after discharge time $T_{DIS}$, auxiliary winding voltage $V_{AUX}$ of auxiliary winding AUX starts oscillating, and gradually converges to 0V. So-called "valley switching" may mean that, after power switch 34 is turned off, power switch 34 is turned on when a $1^{st}$ valley, a $2^{nd}$ valley, a $3^{rd}$ valley, and so on of auxiliary winding voltage $V_{AUX}$ occurs. This type of operating scheme is typically called quasi-resonance (QR) mode.

Through feedback node FB, OFF time controller 66 can determine when auxiliary winding voltage $V_{AUX}$ drops across 0V, so-called zero crossing. OFF time controller 66 may be designed to trigger pulse width controller 64 to turn on power switch 34 through set node SET a predetermined period after auxiliary winding voltage $V_{AUX}$ drops across 0V. Thus, valley switching can be approximately realized. In order to avoid zero-crossing never being detected, OFF time controller 66 can be designed to forcefully trigger pulse width controller 64 to turn on power switch 34 if no zero-crossing has been detected after a maximum OFF time.

In the embodiment of FIG. 4, when feedback voltage $V_{IFB}$ is lower than over-shot reference voltage $V_{OS-REF}$, comparison result $S_{OV}$ is logic 0. At this time, timing of set signal $S_{SET}$ triggering turning on of power switch 34 may be determined according to compensation voltage $V_{COM}$ and zero-crossing detected by OFF time controller 66 through feedback node FB. Simply speaking, when feedback voltage $V_{IFB}$ is lower than over-shot reference voltage $V_{OS-REF}$, power supply controller 26b approximately operates in QR mode, and may trigger turning on of power switch 34 at any valley appearing in auxiliary winding voltage $V_{AUX}$.

When feedback voltage $V_{IFB}$ is greater than over-shot reference voltage $V_{OS-REF}$, comparison result $S_{OV}$ is logic 1, and OFF time controller 66 only triggers pulse width controller 64 to turn on power switch 34 after maximum OFF time. At this time, switching frequency of power switch 34 is necessarily lower than when operating in QR mode.

Similar to power supply controller $26_a$ of FIG. 3, when output voltage $V_{OUT}$ is on the high side, causing feedback voltage $V_{IFB}$ to exceed over-shot reference voltage $V_{OS-REF}$, power supply controller $26_b$ of FIG. 4 causes OFF time of power switch 34 to be maximum OFF time, so that switching frequency immediately drops. Electrical power transmitted by the transformer can be lowered rapidly, which can rapidly prevent output voltage $V_{OUT}$ from rising further.

It is predictable that the power supply controllers of FIG. 3 and FIG. 4 can both rapidly prevent feedback voltage $V_{IFB}$ from rising further, which can reduce output voltage $V_{OUT}$ jitter, and cause output voltage $V_{OUT}$ to converge more rapidly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A primary-side control method comprising:
   providing a feedback node, wherein the feedback node coupled to an auxiliary winding;
   performing sampling on the feedback node during discharging of a secondary winding to generate a feedback voltage;
   providing the feedback voltage, the feedback voltage representing an output voltage of the secondary winding through an inductance-coupling effect;
   controlling, with an ON-triggering controller, a power switch by a first switching frequency;
   comparing the feedback voltage and an over-shot reference voltage; and
   controlling, with the ON-triggering controller, the power switch by a second switching frequency when the feedback voltage is greater than the over-shot reference voltage;
   wherein the second switching frequency is lower than the first switching frequency; the ON-triggering controller is an OFF time controller coupled to the feedback node; the OFF time controller triggers turning on of the power switch when the feedback voltage is lower than the over-shot reference voltage and an auxiliary winding voltage of the auxiliary winding is approximately in a voltage valley; and when the feedback voltage is larger than the over-shot reference voltage, the OFF time controller triggers turning on of the power switch after the power switch is turned off for a maximum OFF time.

2. The primary-side control method of claim 1, further comprising:
   comparing the feedback voltage and a target voltage and a target voltage to control a compensation voltage; and
   controlling ON time of the power switch according to the compensation voltage.

3. The primary-side control method of claim 1, further comprising:
   determining the first switching frequency according to the compensation voltage.

4. A power supply controller for performing primary-side control, comprising:
   a sampler coupled to a feedback node for sampling the feedback node to generate and output a feedback voltage;
   a pulse generator for providing a pulse during discharging of a secondary winding for causing the sampler to sample the feedback node;
   a comparator for comparing the feedback voltage and an over-shot reference voltage, wherein the feedback voltage represents an output voltage of the secondary winding through an inductance-coupling effect; and
   an ON-triggering controller coupled to the comparator, wherein when the feedback voltage is lower than the over-shot reference voltage, the ON-triggering controller causes a power switch to operate at approximately a first switching frequency, and when the feedback voltage is higher than the over-shot reference voltage, the ON-triggering controller causes the power switch to operate at approximately a second switching frequency;
   wherein the second switching frequency is lower than the first switching frequency; the ON-triggering controller is an OFF time controller coupled to the feedback node; the feedback node is coupled to an auxiliary winding; the OFF time controller triggers turning on of the power switch when the feedback voltage is lower than the over-shot reference voltage and an auxiliary winding voltage of the auxiliary winding is approximately in a voltage valley; and when the feedback voltage is larger than the over-shot reference voltage, the OFF time controller triggers turning on of the power switch after the power switch is turned off for a maximum OFF time.

5. The power supply controller of claim 4, further comprising:
   a transconductor for comparing the feedback voltage and a target voltage to control a compensation voltage.

6. The power supply controller of claim 5, wherein the ON-triggering controller is an oscillator for providing a periodic signal to trigger turning on of the power switch, and the compensation voltage determines a switching frequency of the periodic signal.

7. A power management system comprising:
   a transformer having a primary winding, an auxiliary winding, and a secondary winding;
   a power switch coupled to the primary winding for controlling an inductance current flowing through the primary winding; and
   a power supply controller for controlling the power switch, comprising:
      a sampler coupled to a feedback node for sampling the feedback node to generate and output a feedback voltage, wherein the feedback node is coupled to the auxiliary winding;
      a pulse generator for providing a pulse during discharging of the secondary winding for causing the sampler to sample the feedback node;
      a comparator for comparing the feedback voltage and an over-shot reference voltage, wherein the feedback voltage represents an output voltage of the secondary winding through the feedback node and the auxiliary winding; and an ON-triggering controller coupled to the comparator, wherein the ON-triggering controller causes the power switch to operate approximately at a first switching frequency when the feedback voltage is lower than the over-shot reference voltage, and the ON-triggering controller causes the power switch to operate approximately at a second switching frequency when the feedback voltage is higher than the over-shot reference voltage;

wherein the second switching frequency is lower than the first switching frequency; the ON-triggering controller is an OFF time controller coupled to the feedback node; the feedback node is coupled to an auxiliary winding; the OFF time controller triggers turning on of the power switch when the feedback voltage is lower than the over-shot reference voltage and an auxiliary winding voltage of the auxiliary winding is approximately in a voltage valley; and when the feedback voltage is larger than the over-shot reference voltage, the OFF time controller triggers turning on of the power switch after the power switch is turned off for a maximum OFF time.

\* \* \* \* \*